(12) United States Patent
Hallbauer et al.

(10) Patent No.: US 8,292,325 B2
(45) Date of Patent: Oct. 23, 2012

(54) VEHICLE OCCUPANT RESTRAINT SYSTEM COMPRISING AN INFLATABLE GAS BAG

(75) Inventors: Karsten Hallbauer, Staig (DE); Martin Schwann, Blaustein (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/185,413

(22) Filed: Jul. 18, 2011

(65) Prior Publication Data
US 2011/0266782 A1    Nov. 3, 2011

Related U.S. Application Data

(63) Continuation of application No. PCT/EP2010/050567, filed on Jan. 19, 2010.

(30) Foreign Application Priority Data

Jan. 19, 2009  (DE) .................. 10 2009 005 696

(51) Int. Cl.
*B60R 21/239* (2006.01)
(52) U.S. Cl. ..................... 280/739; 280/743.1
(58) Field of Classification Search .................. 280/739, 280/728.1, 730.2, 731, 743.1
See application file for complete search history.

(56) References Cited

U.S. PATENT DOCUMENTS

| | | | |
|---|---|---|---|
| 3,451,693 A | | 6/1969 | Carey |
| 4,805,930 A | * | 2/1989 | Takada ........................ 280/739 |
| 5,007,662 A | * | 4/1991 | Abramczyk et al. .......... 280/739 |
| 5,280,953 A | * | 1/1994 | Wolanin et al. .............. 280/739 |
| 5,492,363 A | | 2/1996 | Hartmeyer et al. |
| 5,518,269 A | | 5/1996 | Storey et al. |
| 5,536,038 A | | 7/1996 | Bollaert et al. |
| 5,603,526 A | * | 2/1997 | Buchanan ..................... 280/739 |
| 5,704,639 A | * | 1/1998 | Cundill et al. ............... 280/739 |
| 5,829,779 A | | 11/1998 | Nakashima et al. |
| 5,899,493 A | * | 5/1999 | Berger ......................... 280/739 |

(Continued)

FOREIGN PATENT DOCUMENTS

DE    199 34 232 A1    1/2000
(Continued)

OTHER PUBLICATIONS

International Preliminary Report on Patentability in PCT/EP2010/050567 dated Jul. 28, 2011.

(Continued)

*Primary Examiner* — Eric Culbreth
*Assistant Examiner* — Barry Gooden, Jr.
(74) *Attorney, Agent, or Firm* — Foley & Lardner LLP (57) ABSTRACT

A vehicle occupant restraint system is provided. The vehicle occupant restraint system comprising a gas bag inflatable with gas, which includes at least one first fabric layer and one second fabric layer, which are connected with each other along their edge by means of a peripheral seam, and at least one outflow opening via which gas can flow out of the gas bag, wherein the outflow opening is formed by an interruption of the peripheral seam, wherein the peripheral seam is interrupted such that it comprises on both sides of the outflow opening a portion extending substantially vertical to the adjoining edge of the gas bag and ending at the edge of the gas bag, and at least one additional seam formed in the region of the outflow opening is provided, which at least partly closes the outflow opening, wherein the additional seam is designed such that it opens during the inflation process.

16 Claims, 7 Drawing Sheets

U.S. PATENT DOCUMENTS

| | | |
|---|---|---|
| 6,254,130 B1 * | 7/2001 | Jayaraman et al. ........ 280/743.2 |
| 6,419,262 B1 * | 7/2002 | Fendt et al. .................. 280/729 |
| 6,802,528 B2 * | 10/2004 | Short et al. ................ 280/728.3 |
| 7,108,278 B2 | 9/2006 | Kai et al. |
| 2003/0189320 A1 * | 10/2003 | Short et al. ................ 280/728.3 |
| 2007/0013177 A1 | 1/2007 | Abe |
| 2007/0267851 A1 * | 11/2007 | Svenbrant et al. ............ 280/729 |
| 2008/0179867 A1 | 7/2008 | Riedel et al. |
| 2010/0038889 A1 | 2/2010 | Feller |
| 2010/0045008 A1 | 2/2010 | Klaiber et al. |

FOREIGN PATENT DOCUMENTS

| | | |
|---|---|---|
| DE | 198 59 767 A1 | 7/2000 |
| DE | 103 20 120 A1 | 12/2004 |
| DE | 103 27 951 A1 | 1/2005 |
| DE | 10 2004 058 440 A1 | 6/2006 |
| DE | 20 2006 017 996 U1 | 3/2007 |
| DE | 10 2008 063 919 A1 | 7/2009 |
| EP | 0 728 629 A2 | 8/1996 |
| EP | 1 475 278 B1 | 11/2004 |
| EP | 1 743 811 A1 | 1/2007 |
| JP | 07-205738 | 8/1995 |
| JP | 09-011845 | 1/1997 |
| JP | 09-323604 | 12/1997 |
| JP | 2009-149207 | 7/2009 |
| WO | WO-2007/009427 A2 | 1/2007 |
| WO | WO-2008/061888 A1 | 5/2008 |
| WO | WO-2008/129031 A2 | 10/2008 |

OTHER PUBLICATIONS

International Search Report in PCT/EP2010/050567 dated Apr. 14, 2010.

* cited by examiner

VEHICLE OCCUPANT RESTRAINT SYSTEM COMPRISING AN INFLATABLE GAS BAG

CROSS-REFERENCE TO RELATED PATENT APPLICATIONS

This application is a continuation of International Patent Application Number PCT/EP2010/050567, filed on Jan. 19, 2010, which was published in Germany as WO 2010/081909. The foregoing international application is incorporated by reference herein. entirety.

BACKGROUND OF THE INVENTION

This invention relates to a vehicle occupant restraint system comprising an inflatable gas bag.

It is generally known to provide a gas bag of a vehicle occupant restraint system with one or more outflow openings via which gas can flow off from the gas bag to avoid a too high internal pressure. Gas bags with outflow openings are known for example from WO 2007/009427 A1.

U.S. Pat. No. 5,536,038 A describes a gas bag in which by means of a relatively expensive gas bag design circular outflow openings are formed in the seam region of a gas bag formed of two fabric layers. Each of the fabric layers includes semicircularly cut-out regions which form the circular outflow openings. In the region of the outflow openings the seam connecting the fabric layers is interrupted. An outflow opening formed by an interrupted seam furthermore is known from JP 09011845 A.

DE 199 34 232 A1 describes a gas bag in which an outflow opening is provided by an interruption of a peripheral seam. Furthermore, in the region of the outflow opening a tear seam is provided, which is made with a thread weaker than the thread of the peripheral seam.

SUMMARY OF THE INVENTION

It is an object of the invention to provide a vehicle occupant restraint system with an inflatable gas bag with one or more outflow openings which have an advantageous design.

According to an exemplary embodiment of the invention there is provided a gas bag with at least one outflow opening which is formed by interrupting a peripheral seam which connects a first fabric layer and a second fabric layer of the gas bag along its edge. In the interrupted region, which forms the outflow opening, an additional seam is provided, which at least partly closes the outflow opening. The additional seam is designed such that it opens during the inflation process and hence completely clears the outflow opening. In particular, the additional seam opens in the case of a condition occurring during an inflation process, which for example consists in that a certain internal pressure of the gas bag is reached or that a certain temperature inside the gas bag is reached. The internal pressure leads to a movement of the gas bag fabric layers relative to each other.

Furthermore, it is provided that for forming an outflow opening the peripheral seam is interrupted such that it forms a portion extending substantially vertical to the adjoining edge of the gas bag on both sides of the outflow opening and each ends at the edge of the gas bag. As a result, the outflow opening forms a tubular or cylindrical region in the inflated condition. The peripheral seams correspondingly extending on both sides of the outflow opening thus form a kind of channel. The gas therefore can flow out of the outflow opening effectively and without any major turbulence at the interruption points of the peripheral seam. The cross-section of the tubular or cylindrical region of the outflow opening for example is circular or oval.

The solution in accordance with the invention provides for delaying the outflow of gas from the gas bag, until for example a certain internal pressure has built up in the gas bag. In accordance with the invention, this initial build-up of pressure can be effected faster than would be the case if the outflow opening was open from the outset, as a premature loss of gas is prevented by the temporary closure of the outflow opening. At the same time, a solution is provided in which the risk of squeezing off the outflow opening by the vehicle occupant or intruding vehicle components is minimized due to the formation of the outflow opening in the peripheral seam of the gas bag. Such squeezing off has led to an undesired too hard passenger restraint.

A peripheral seam in the sense of the present invention is any connection, also an adhesive connection, which connects at least one first fabric layer and a second fabric layer with each other along its edge and correspondingly extends substantially parallel to or at a distance to the edge or to the outer contour of the gas bag. The peripheral seam can be composed of different individual seams which extend in parallel and/or successively. Furthermore, it is possible that the gas bag includes more than two fabric layers. For example, one front and one rear gas bag envelope is each formed by a double fabric layer, so that a total of four fabric layers are present. The fabric layers of the gas bag can be made of any gas bag material.

The additional seam provided in accordance with the invention at least partly closes the outflow opening, i.e. the outflow opening can be closed completely or partly. In the case of a merely partial closure, an escape of gas until opening of the additional seam is not prevented, but merely reduced. This also leads to an accelerated increase in pressure in the gas bag interior and hence to an earlier build-up of a restraining force at the vehicle occupant.

"Opening" of the additional seam is understood to be any kind of dissolution or elimination of the additional seam. "Opening" of the additional seam for example comprises tearing of the additional seam or melting of an additional seam made of plastics, if a certain temperature exists in the gas bag interior. For manufacturing the additional seam, all known seam materials or seam shapes can be used in principle.

In one exemplary aspect of the invention, the additional seam is designed such that it opens before a vehicle occupant to be restrained, who is seated in the normal position, comes into restraining contact with the gas bag. Opening of the additional seam thus is effected relatively shortly after commencement of the deployment process and before reaching the load maximum. It thus is ensured that the advantages provided by the outflow opening, namely preventing a too high internal pressure and hence a too hard passenger restraint, already have occurred when the vehicle occupant to be restrained comes into contact with the gas bag.

In a further exemplary aspect, the outflow opening is arranged in the peripheral seam of the gas bag such that it cannot come into contact with a vehicle occupant to be restrained or with intruding vehicle components. For this purpose, the outflow opening of a gas bag formed as side gas bag for example is formed at a front region of the gas bag with respect to the vehicle direction. In this way, it is avoided that the outflow opening is squeezed off by the vehicle occupant and thereby the escape of gas from the outflow opening is prevented.

The additional seam realized in the region of an outlet opening can be varied in different ways, in order to adapt the opening behavior of the gas bag to the restraint requirements. For this purpose, different shapes of the additional seam can be provided on the one hand. For example, at least one additional seam can extend substantially parallel or vertical to the outer contour of the gas bag in the region of the outflow opening. Furthermore, the additional seam can completely or merely partly close the outflow opening. It can extend straight or bent and/or be formed rounded at its edge. On the other hand, the stitch width of the seam region and/or the parameters of the thread forming the tear seam can be varied or set as further matching parameters.

In a further exemplary design variant it is provided that the additional seam intersects the peripheral seam at least once. It thus is ensured that no gas can flow through and escape between the additional seam and the peripheral seam, while the additional seam still exists.

A further exemplary aspect of the present invention provides that the outer contour of the gas bag extends substantially continuously, for example linearly, in the region of the outflow opening. The outer edge of the gas bag thus follows the outer contour also in the region of the outflow opening, without the gas bag having any recesses or indentations in the region of the outflow openings, as it is provided in U.S. Pat. No. 5,536,038 A. For forming an outflow opening, the individual fabric layers of the gas bag thus are not provided with indentations or cut-outs. In the expanded condition, the fabric layers rather lie against each other in parallel in the region of the outflow opening by forming a common edge region which follows the outer contour of the gas bag and is formed linear, for example.

During inflation and deployment of the gas bag and after opening the additional seam, the outflow opening forms a circular or cylindrical shape, in dependence on the design of the peripheral seam adjacent to the outflow opening.

The first and second fabric layers, which are connected with each other in their edge region by the peripheral seam for forming the gas bag, can be formed of a single or of different fabric sections. In one aspect of the invention it is provided that the two fabric layers are formed by two regions folded onto each other of a single, symmetrical fabric section. Such symmetrical fabric section also is referred to as "butterfly design." Due to the symmetrical cut, the gas bags can be produced the same on the left and right up to the fold, i.e. the gas bags can be used both on the right side and on the left side of the vehicle, which simplifies the manufacturing process.

In an alternative aspect, the two fabric layers are formed by two separate fabric sections which are placed on top of each other and are connected by means of the peripheral seam. As in this aspect there is no edge region formed by a fold, the two fabric layers are connected with each other along their entire circumference (apart from an opening for a gas generator or a filler neck and apart from the outflow openings in accordance with the invention).

A further exemplary aspect provides that the strength of the additional seam is adapted to an OOP situation (OOP="Out Of Position") in the sense that the additional seam opens before the internal pressure in the gas bag becomes OOP-critical. The additional seam thus is designed such that it opens before the gas bag pressure reaches a value which would be unfavorable for a vehicle occupant in an OOP situation.

The gas bag can include a plurality of chambers, wherein one outflow opening in accordance with the invention, which is provided with an additional seam, is realized in at least one of the chambers.

BRIEF DESCRIPTION OF THE DRAWINGS

The invention will be explained in detail below by means of several embodiments with reference to the Figures of the drawing.

DETAILED DESCRIPTION OF THE PREFERRED EMBODIMENTS

The Figures relate to a gas bag of a vehicle occupant restraint system. Beside the illustrated gas bag the vehicle occupant restraint system includes further typical elements of a vehicle occupant restraint system, such as in particular a gas generator, airbag sensors and a control device. In dependence on the concrete implementation, the restraint system furthermore can include elements such as a diffuser, a gas lance and/or a housing or some other casing. Such elements are not shown separately in the Figures, as they are known to the skilled person.

It is furthermore pointed out that the gas bags described below are formed as side airbags. Corresponding outflow openings can, however, also be implemented in gas bags of any other airbags.

Figure 1:
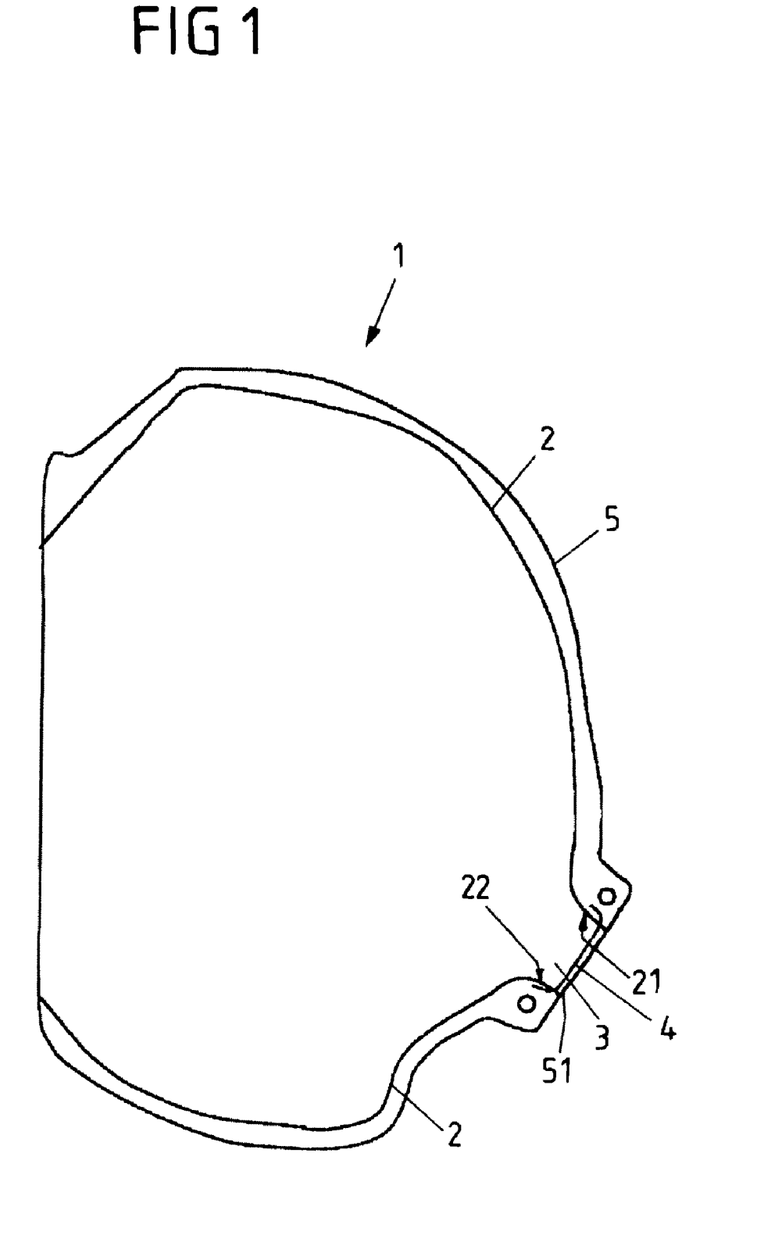
FIG. 1 shows a first embodiment of a side gas bag with an additional seam provided in the region of an outflow opening of the gas bag.

FIG. 1 shows a gas bag 1 of a vehicle occupant restraint system spread out flat, which includes two fabric layers which are connected with each other by means of a peripheral seam 2. Manufacturing such gas bag is effected for example by using an axially symmetrical design of a gas bag section 10 shown in FIG. 2 by way of example, which also is referred to as "butterfly" design. The gas bag section 10 shown in FIG. 2 includes two halves 12, 13 symmetrical with respect to a middle axis 11. The gas bag is folded once along the middle axis 11, wherein due to the symmetrical design the two halves 12, 13 of the gas bag section 10 including their edges come to lie on each other and form a common outer edge and hence outer contour 5 (cf. FIG. 1). Via the peripheral seam 2 the two fabric layers 12, 13 of the gas bag section 10 placed on top of each other are connected with each other along their edge.

Figure 2:
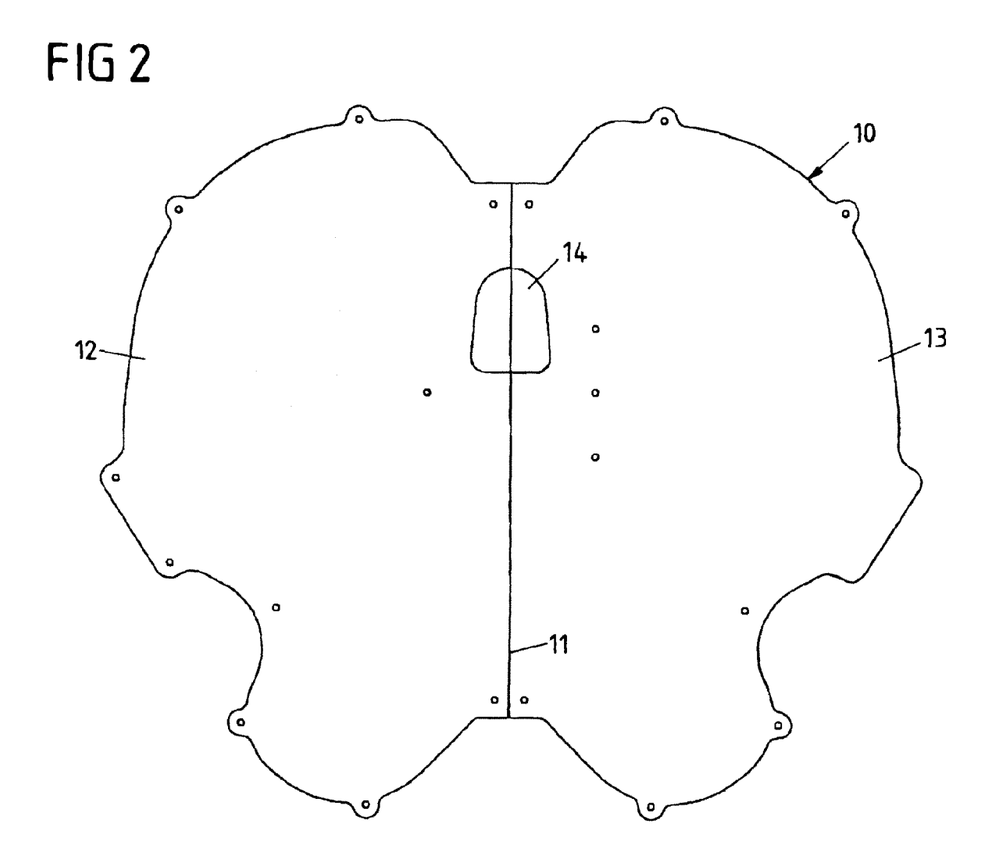
FIG. 2 shows a gas bag section for manufacturing a gas bag as shown in FIG. 1.

The gas bag section 10 of FIG. 2 furthermore includes an opening 14 for introducing a gas generator or a gas generator region into the gas bag 1. Mounting the gas generator to the gas bag 1 can be effected for example corresponding to FIGS. 7A to 7E of WO 2008/129031 A2. The opening 14 is not shown in the schematic representation of FIG. 1, as it is not essential for the present invention.

For forming an outflow opening, the peripheral seam 2 is formed interrupted in a region 3, i.e. the interruption of the peripheral seam 2 forms the outflow opening 3. For forming the outflow opening 3, the peripheral seam 2 locally is guided adjacent to the outflow opening 3 such that it goes from a course substantially parallel to the outer edge 5 of the gas bag 1 to a course substantially vertical to the outer edge of the gas bag 1 and ends at the outer edge 5 of the gas bag substantially at right angles. There are obtained two substantially parallel portions 21, 22 of the peripheral seam 2, which define the outflow opening 3 and end at the outer edge 5. Due to the parallel course of the regions 21, 22 of the peripheral seam 2, the outflow opening 3 forms a tubular or cylindrical region in the inflated condition, whose length depends on the length of the parallel seam regions 21, 22. In this way, the gas can flow out of the outflow opening 3 effectively and without any major turbulence at the interruption points of the peripheral seam 2.

The substantially parallel portions 21, 22 for example have a length which lies in a range between 2 mm and 50 mm, in particular in a range between 5 mm and 35 mm.

It should be noted that the way of forming the outflow opening 3 in FIG. 1 should merely be understood by way of example. It is also conceivable, for example, that the peripheral seam 2 merely is interrupted adjacent to the outflow opening 3, without deviating from a course substantially parallel to the outer contour 5 of the gas bag 1. It can possibly be provided that the peripheral seam 2 each is locally reinforced at the point at which it ends for forming the outflow opening 3, in order to safely prevent tearing out when gas flows out of the outflow opening 3.

The outer contour 5 of the gas bag 1 spread out flat forms a linear region 51 in the region of the outflow opening 3. This also contributes to a substantially cylindrical shape of the blow-out opening 3 in the inflated gas bag.

It is provided that the outflow opening 3 is closed by an additional seam 4. The additional seam 4 at least partly connects the two fabric layers of the gas bag 1 in the region of the outflow opening 3. This effects a temporary closure of the gas outflow opening 3. A premature loss of gas when filling the gas bag 1 with gas of a gas generator in the event of triggering thereby is avoided. In this way, a build-up of pressure in the gas bag can be effected faster. At the same time, the additional seam 4 is formed such that it will tear during the inflation process, in particular when a certain internal pressure and/or a certain internal temperature in the gas bag are reached.

The tear strength of the additional seam or the time at which the additional seam will tear during the inflation process, can be set by certain matching parameters. Such adjustment can be effected e.g. via the seam shape. Different seam shapes will be explained below with reference to FIGS. 4A to 4T. As further matching parameters, the stitch width and the thread thickness as well as the thread material can additionally be adjusted for each seam shape.

Opening the seam region by flowing through the same and by melting the thread likewise can be used as opening parameter: The additional seam is formed such that it does not completely seal the outflow opening, so that the hot internal gas of the gas bag is pressed through the additional seam. At the same time, the additional seam is made of a fusible thread. Since the gas temperature is higher than the melting temperature of the thread of the additional seam, this leads to a melting of the thread and hence to an opening of the additional seam. Via the melting temperature and the thickness of the thread as well as the degree of flowing through the seam, the time at which the additional seam opens during the inflation process can be adjusted.

The achievable restraining work of the inflated gas bag at the throttle formed by the outflow opening is proportional to the amount of gas available.

Preferably, the additional seam is formed such that it will tear and an outflow of gas from the deploying gas bag will be effected before the passenger makes contact with the gas bag. As a result it is ensured that the passenger to be restrained does not impact on too hard a gas bag. The maximum possible restraining work is reduced.

Figure 3:
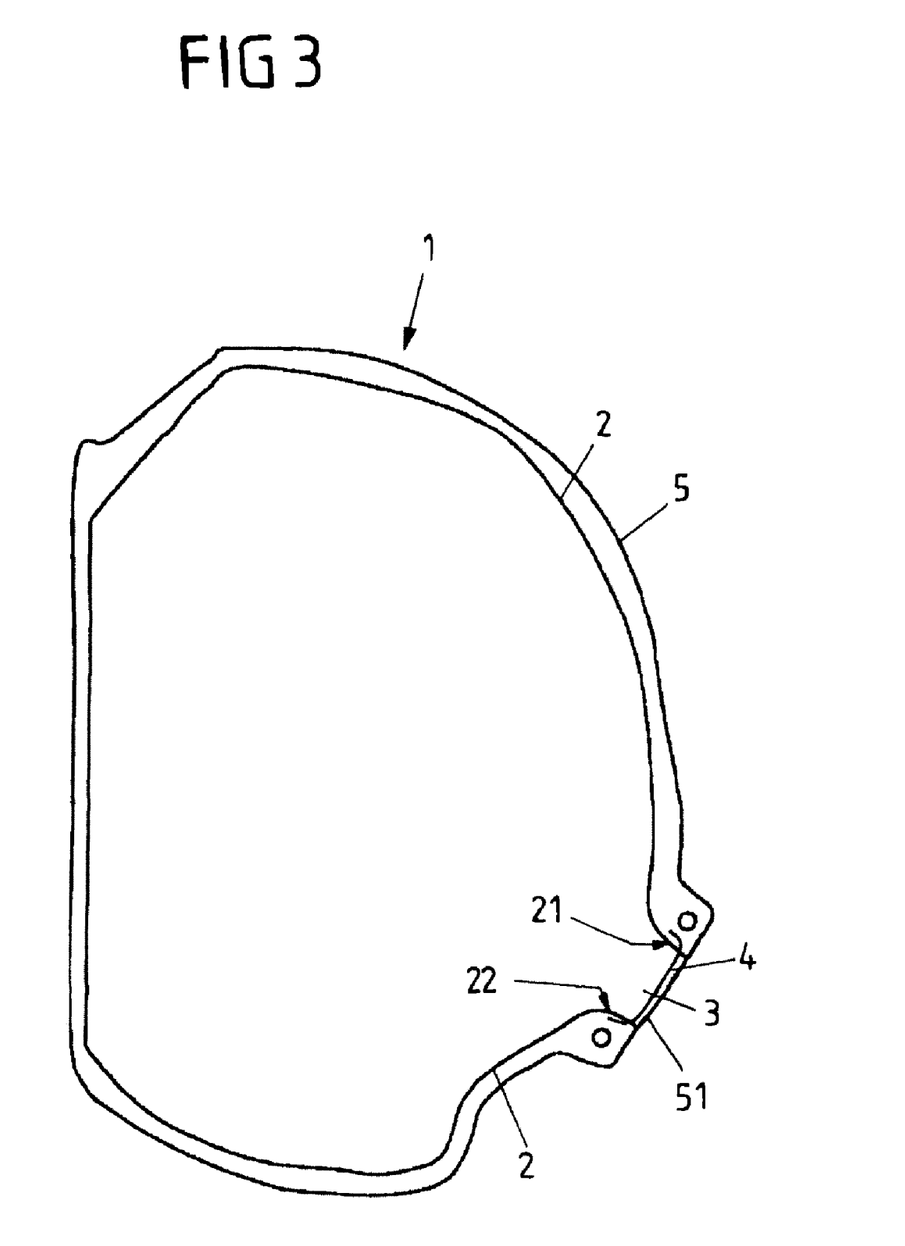
FIG. 3 shows a second embodiment of a side gas bag with an additional seam provided in the region of an outflow opening of the gas bag

FIG. 3 shows a gas bag design in which the gas bag is made of two separate gas bag sections and not of one single gas bag section like in the "butterfly" design of FIG. 1. Correspondingly, the peripheral seam 2 extends along the entire outer circumference of the gas bag 1. What is not shown is an opening for introducing a gas generator into the gas bag. As regards the design of the outflow opening 3 and the additional seam 4, there are no differences to the design of FIG. 1, so that reference is made to the corresponding explanations.

Figure 4A:
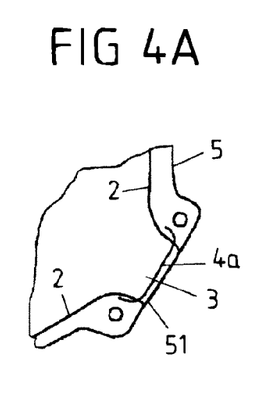
FIGS. 4A-4T show possible seam courses of an additional seam in the region of an outflow opening of a gas bag.
Figure 4B:
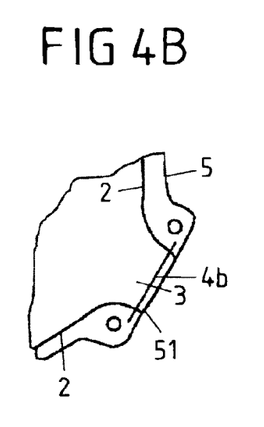
Figure 4C:
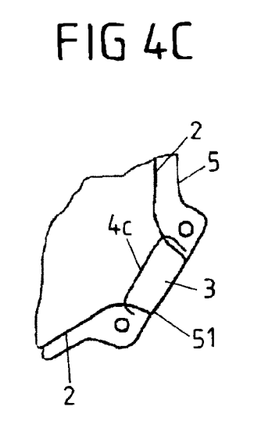
Figure 4D:
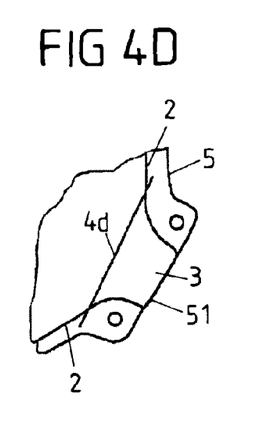
Figure 4E:
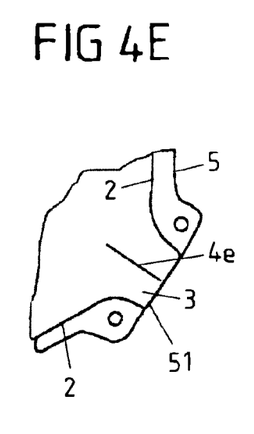
Figure 4F:
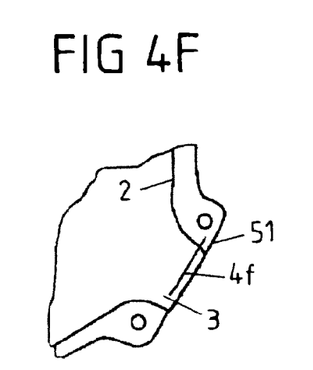
Figure 4G:
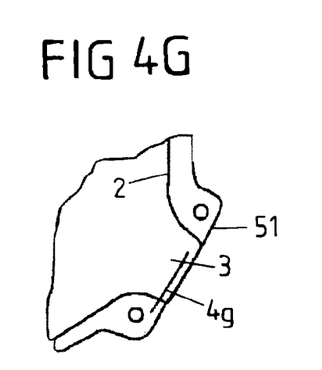
Figure 4H:
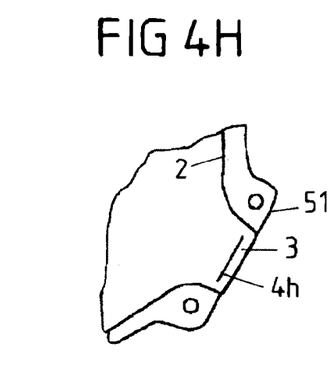
Figure 4I:
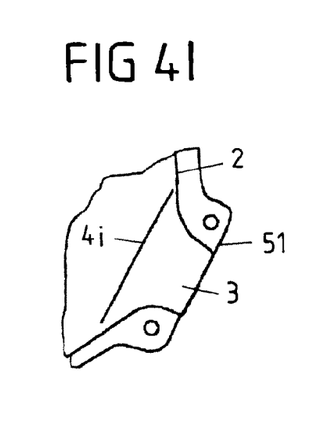
Figure 4J:
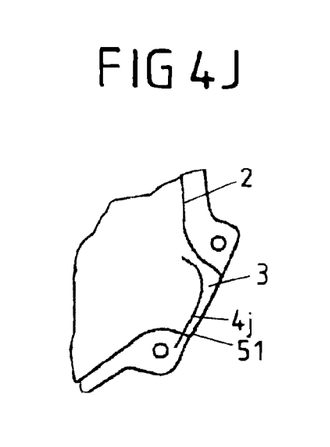
Figure 4K:
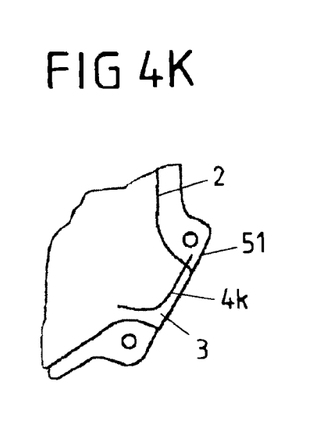
Figure 4L:
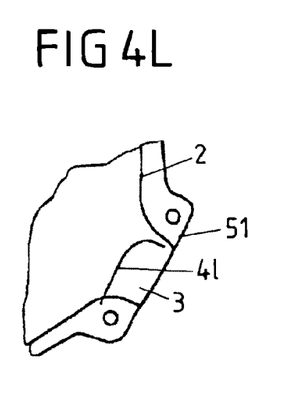
Figure 4M:
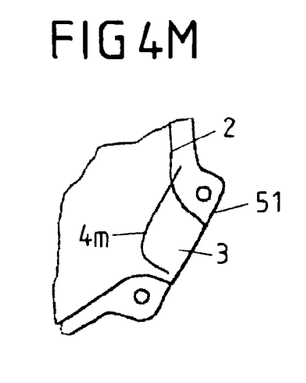
Figure 4N:
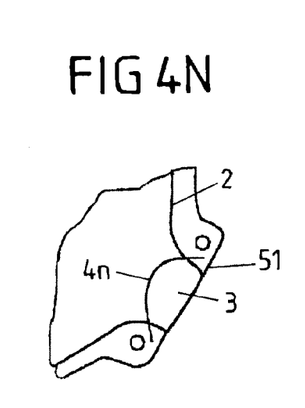
Figure 4O:
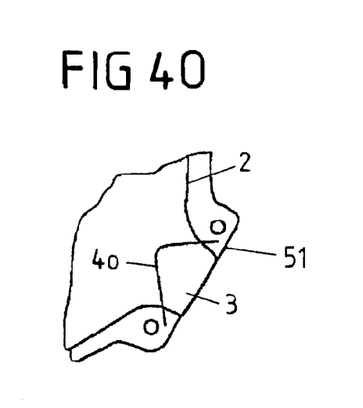
Figure 4P:
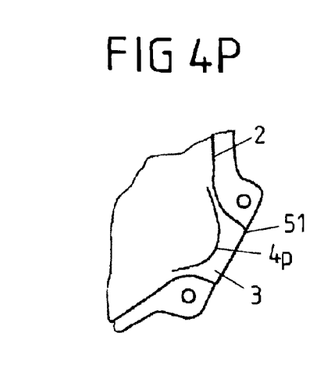
Figure 4Q:
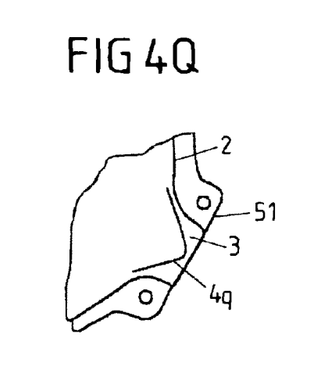
Figure 4R:
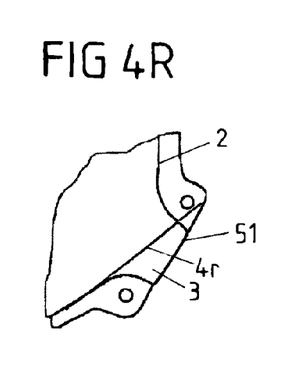
Figure 4S:
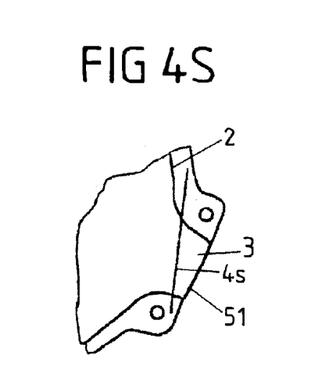
Figure 4T:
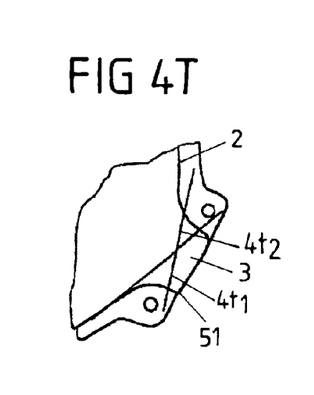

FIGS. 4A to 4T show different design variants with regard to the course and the shape of the additional seam 4.

In FIG. 4A, the additional seam 4a extends across the entire width of the outflow opening 3. It extends substantially parallel to the outer contour 51 of the gas bag in the region of the outflow opening 3. The ends of the additional seam 4a are angled in direction of the gas bag interior.

In the embodiment of FIG. 4B, the additional seam 4b extends linearly along its entire length and parallel to the outer contour 51 of the gas bag in the region of the outflow opening 3. The outflow opening 3 is completely closed by the additional seam 4b just like in FIG. 4A.

In FIG. 4C the additional seam 4c again completely closes the outflow opening 3. The additional seam 4c, however, has a greater distance from the outer edge 51 of the gas bag. The ends of the additional seam 4c are bent away from the gas bag interior. FIG. 4D shows an additional seam 4d, which like in FIG. 4B extends completely linearly, but is arranged at a greater distance from the outer contour 51 of the gas bag.

In the designs of FIGS. 4A to 4D the additional seam 4a, 4b, 4c, 4d each intersects the peripheral seam 2. This ensures a gas-tight closure of the outflow opening 3, as long as the additional seam exists.

FIG. 4E shows an embodiment in which an additional seam 4e extends vertical to the outer edge 51 of the gas bag in the region of the outflow opening 3. Correspondingly, the outflow opening 3 is not closed completely, but merely reduced in size.

In FIGS. 4F, 4G and 4H additional seams 4f, 4g, 4h are provided, which like in FIG. 4B are arranged linearly adjacent to the outer edge 51 of the gas bag and extending parallel to the same. The closure of the outflow opening 3 is, however, not effected completely, but only partly. Correspondingly, the additional seam intersects the peripheral seam 2 merely in an upper point (FIG. 4F), in a lower point (FIG. 4G) or not at all (FIG. 4H).

In FIG. 4I the linearly extending additional seam 4i has a greater distance from the outer edge 51 of the gas bag. Here as well, a distance is provided between the ends of the additional seam 4i and the peripheral seam 2, so that the outflow opening 3 is only partly closed.

In FIGS. 4J, 4K, 4L and 4M the peripheral seam 4j, 4k, 4l, 4m each is formed from a straight portion and a bent portion, wherein the straight portion intersects the peripheral seam 2 in one point and the bent portion ends in the region of the outflow opening 3. Thus, the outflow opening 3 again is only partly closed. Via the orientation of the bent portion, the resistance provided by the additional seam against the outflowing gas can be adjusted and hence it is also possible to influence the time at which the additional seam will tear.

In FIGS. 4N, 4O, 4P and 4Q peripheral seams 4n, 4o, 4p and 4q are provided, which are formed U-shaped or V-shaped, wherein the middle region of the "V" or "U" faces the gas bag interior (FIGS. 4N, 4O) or faces away from the same (FIGS. 4P, 4Q). The kind of orientation again represents an opening parameter.

In FIGS. 4R and 4S additional seams 4r, 4s formed straight are provided, which completely close the outflow opening 3, but which in this design to not extend parallel to the outer edge 51 of the gas bag, but at an angle to the same.

In FIG. 4T two crossed, each linearly extending additional seams 4*t*1, 4*t*2 are provided, which extend corresponding to the seams 4*r*, 4*s* of FIGS. 4R, 4S.

The additional seams shown in FIGS. 4A to 4T can also be realized in any combination, as is shown by way of example with reference to FIG. 4T.

The invention is not limited in its design to the described embodiments, which should merely be understood as examples. For example, the kind of interruption of the additional seam for forming an outflow opening can be effected in some other way. Moreover, the present invention is not limited to certain types of gas bags. The solution in accordance with the invention can be used for example in 1-chamber thorax side airbags, 1-chamber pelvis thorax side airbags, 1-chamber head thorax side airbags, 2-chamber pelvis thorax side airbags, 2-chamber head thorax side airbags, multi-chamber head thorax pelvis side airbags, head airbags, driver airbags, passenger airbags, knee airbags and generally in airbags which in a side impact protect the passenger sitting facing away from the side of the impact (so-called "far-side airbags").

The priority application, German Patent Application Number 10 2009 005 696.3, filed on Jan. 19, 2009 is incorporated by reference herein.

What is claimed is:

1. A vehicle occupant restraint system comprising
    a gas bag configured to be inflated with gas, which includes a first fabric layer and a second fabric layer connected with each other along their edges by a peripheral seam, and
    an outflow opening via which the gas can flow out of the gas bag, wherein the outflow opening is formed by an interruption of the peripheral seam such that the peripheral seam comprises first and second portions located on opposite sides of the outflow opening, and wherein the first and second portions extend continuously with adjacent peripheral seam segments and extend substantially perpendicular to an outer edge of the gas bag, and end at the outer edge of the gas bag, and
    an additional seam formed in a region of the outflow opening that at least partly closes the outflow opening, wherein the additional seam is configured such that it opens during an inflation process.

2. The vehicle occupant restraint system according to claim 1, wherein the additional seam is configured such that it closes the outflow opening until reaching a condition that occurs during the inflation process.

3. The vehicle occupant restraint system according to claim 1, wherein the additional seam is configured such that it opens before a vehicle occupant to be restrained comes into contact with the gas bag.

4. The vehicle occupant restraint system according to claim 1, wherein the outer edge of the gas bag is substantially continuous in the region of the outflow opening.

5. The vehicle occupant restraint system according to claim 1, wherein in an inflated condition of the gas bag the outflow opening is configured to form a substantially cylindrical region.

6. The vehicle occupant restraint system according to claim 1, wherein the outflow opening is arranged in the peripheral seam of the gas bag such that it is not closed by contact of the gas bag with a vehicle occupant to be restrained or with intruding vehicle components.

7. The vehicle occupant restraint system according to claim 6, wherein the gas bag is formed as a side gas bag and the outflow opening is formed at a front region of the gas bag with respect to a vehicle direction.

8. The vehicle occupant restraint system according to claim 1, wherein the additional seam extends substantially parallel to the outer edge of the gas bag in the region of the outflow opening.

9. The vehicle occupant restraint system according to claim 1, wherein the additional seam extends substantially perpendicular to the outer edge of the gas bag in the region of the outflow opening.

10. The vehicle occupant restraint system according to claim 1, wherein the additional seam completely closes the outflow opening.

11. The vehicle occupant restraint system according to claim 1, wherein a strength of the additional seam is adapted to an out of position situation such that the additional seam is configured to open before an internal pressure in the gas bag becomes out of position critical.

12. The vehicle occupant restraint system according to claim 1, wherein the additional seam partly closes the outflow opening.

13. The vehicle occupant restraint system according to claim 1, wherein the peripheral seam is located substantially parallel to the outer edge of the gas bag in regions adjacent to the outflow opening and the peripheral seam turns to form the first and second portions such that the first and second portions are substantially parallel to each other.

14. The vehicle occupant restraint system according to claim 1, wherein the additional seam intersects the peripheral seam at least once.

15. The vehicle occupant restraint system according to claim 4, wherein the outer edge of the gas bag has no recesses or indentations in the region of the outflow opening.

16. The vehicle occupant restraint system according to claim 1, wherein the outer edge of the gas bag is substantially linear in the region of the outflow opening.

* * * * *